(12) United States Patent
Li et al.

(10) Patent No.: US 11,140,298 B2
(45) Date of Patent: Oct. 5, 2021

(54) UNIVERSAL COLOR CODING SYSTEM, AND A SYSTEM AND A METHOD OF MANIPULATING COLORS USING SUCH COLOR CODING SYSTEM

(71) Applicant: City University of Hong Kong, Kowloon (HK)

(72) Inventors: Han-Lin Li, Kowloon (HK); Way Kuo, Kowloon (HK)

(73) Assignee: City University of Hong Kong, Kowloon (HK)

(*) Notice: Subject to any disclaimer, the term of this patent is extended or adjusted under 35 U.S.C. 154(b) by 0 days.

(21) Appl. No.: 16/720,228

(22) Filed: Dec. 19, 2019

(65) Prior Publication Data
US 2021/0195064 A1 Jun. 24, 2021

(51) Int. Cl.
*H04N 1/54* (2006.01)

(52) U.S. Cl.
CPC .................................... *H04N 1/54* (2013.01)

(58) Field of Classification Search
None
See application file for complete search history.

(56) References Cited

U.S. PATENT DOCUMENTS

| | | | | |
|---|---|---|---|---|
| 6,219,452 B1 * | 4/2001 | Nair | ...................... | G06K 9/6203 382/217 |
| 6,222,940 B1 * | 4/2001 | Wenzel | ................ | G06K 9/6203 382/217 |
| 6,229,921 B1 * | 5/2001 | Wenzel | ................ | G06K 9/6203 382/209 |
| 6,343,264 B1 * | 1/2002 | Fenton | ..................... | G01J 3/526 345/426 |
| 6,356,363 B1 * | 3/2002 | Cooper | .................. | G06K 15/00 358/1.8 |
| 6,370,270 B1 * | 4/2002 | Nair | ....................... | G06K 9/6203 382/209 |
| 7,623,141 B2 * | 11/2009 | Brown Elliott | .......... | G09G 3/20 345/214 |
| 7,689,058 B2 * | 3/2010 | Brown Elliott | ....... | G09G 3/2003 382/260 |
| 2002/0067849 A1 * | 6/2002 | Klassen | ................ | H04N 1/6058 382/162 |
| 2002/0146172 A1 * | 10/2002 | Nair | .......................... | G06K 9/20 382/195 |
| 2002/0147568 A1 * | 10/2002 | Wenzel | ..................... | G06K 9/20 702/167 |
| 2003/0083850 A1 * | 5/2003 | Schmidt | ................... | G06T 7/001 702/189 |
| 2003/0151611 A1 * | 8/2003 | Turpin | ................ | G06Q 30/0641 345/589 |
| 2005/0288870 A1 * | 12/2005 | Seul | .................. | G01N 33/54313 702/20 |
| 2006/0036632 A1 * | 2/2006 | Williams | ................ | G06Q 10/00 |

(Continued)

*Primary Examiner* — Anh-Vinh Thi Nguyen
(74) *Attorney, Agent, or Firm* — Renner, Kenner, Greive, Bobak, Taylor & Weber

(57) ABSTRACT

A universal color coding system, and a system and a method of manipulating colors using such color coding system. The color coding system includes a color mapper arranged to map a plurality of colors with a plurality of numerical codes, wherein the each of the plurality of numerical codes is a unique integer determined based on a combination of prime numbers.

49 Claims, 4 Drawing Sheets
(1 of 4 Drawing Sheet(s) Filed in Color)

(56) References Cited

U.S. PATENT DOCUMENTS

| | | | | |
|---|---|---|---|---|
| 2009/0167763 A1* | 7/2009 | Waechter | ................ | G06T 15/06 |
| | | | | 345/426 |
| 2011/0050926 A1* | 3/2011 | Asano | ................ | H04N 1/00472 |
| | | | | 348/211.2 |
| 2015/0043018 A1* | 2/2015 | Tanimoto | ........... | G06K 15/1878 |
| | | | | 358/1.9 |
| 2015/0106235 A1* | 4/2015 | Gershon | .............. | G06K 9/4652 |
| | | | | 705/26.63 |
| 2015/0264364 A1* | 9/2015 | Zhang | .................. | H04N 19/136 |
| | | | | 375/240.18 |
| 2016/0286241 A1* | 9/2016 | Ridge | .................... | H04N 19/46 |
| 2016/0371854 A1* | 12/2016 | Gershon | ............ | G06Q 30/0639 |
| 2017/0200289 A1* | 7/2017 | Gershon | ................ | G06K 9/628 |

\* cited by examiner (For i = 0, ... , 18)

$T_i' = 30^0$    $T_{19}' = 30^{50}$ $(2 \times 3 \times 5)^0$ → $(2 \times 3 \times 5)^{255}$

400

$[2^{2553}3^{169}]^{1.5}$ $[30^{85}]^{1.5}$

UNIVERSAL COLOR CODING SYSTEM, AND A SYSTEM AND A METHOD OF MANIPULATING COLORS USING SUCH COLOR CODING SYSTEM

TECHNICAL FIELD

The present invention relates to a universal color coding system, and particularly, although not exclusively, to a color coding system based on prime numbers for easy color manipulations.

BACKGROUND

Color may be considered as a physical property of an object or even energy with respect to a wavelength of light reflected by the object or substance, or emitted from a light source. Color of light has a direct relation with the wavelength of the electromagnetic (EM) wave, for example, in the visible light spectrum, red light generally refers to EM wave with wavelength close to the spectrum at around 650 nm, whereas blue/violet light generally refers to the 400 nm end.

A color may also be specified based on attributes such as hue, saturation, brightness or a combination of basic colors in a color representation or color space. In an example color representation, a color may be represented by a coordinate of a point on a color graph. Alternatively, a color may be specified based on intensity or "amount" of each of the basic colors in a color space which combine to form such a color.

SUMMARY OF THE INVENTION

In accordance with a first aspect of the present invention, there is provided a color coding system comprising a color mapper arranged to map a plurality of colors with a plurality of numerical codes, wherein the each of the plurality of numerical codes is a unique integer determined based on a combination of prime numbers.

In an embodiment of the first aspect, each of the plurality of numerical codes is arranged to represent a unique color in a color space.

In an embodiment of the first aspect, the plurality of numerical codes are integers calculated based on a multiplication of prime numbers.

In an embodiment of the first aspect, each of the prime numbers represents a respective basic color of the color space.

In an embodiment of the first aspect, the integer is obtain by a multiplication of all color components $p_i^j$, wherein each $p_i$ is the prime number denoting each of the basic colors i, and j represents an intensity of each of the color components $p_i$.

In an embodiment of the first aspect, the prime numbers include at least 2, 3 and 5.

In an embodiment of the first aspect, the unique color i is represented by the integer is denoted by I (i), and follows a relationship of $I(i) = p_1^{\alpha_i} p_2^{\beta_i} p_3^{\sigma_i}$.

In an embodiment of the first aspect, $I(i) = 2^{\alpha_i} 3^{\beta_i} 5^{\sigma_i}$.

In an embodiment of the first aspect, the intensities of each of the color components are represented by $\alpha_i, \beta_i, \sigma_i \in \{0, 1, 2, \ldots, 255\}$.

In an embodiment of the first aspect, the integer is obtain by the multiplication of all the color components $p_i^j$ and a darkness level component, wherein the darkness level component is associated with a combination of all of the color components $p_i^j$.

In an embodiment of the first aspect, the integer is denoted by I, and is represented as $I(i) = p_1^{\alpha_i - \delta_i} p_2^{\beta_i - \delta_i} p_3^{\sigma_i - \delta_i} p_1 p_2 p_3^{\delta_i}$, wherein $\delta_i$ represents an intensity of the darkness level component.

In an embodiment of the first aspect, $I(i) = 2^{\alpha_i - \delta_i} 3^{\beta_i \delta_i} 5^{\sigma_i - \delta_i} 30^{\delta_i}$.

In an embodiment of the first aspect, $\delta_i = \min(\alpha_i, \beta_i, \sigma_i)$, $\alpha_i - \delta_i \geq 0$, $\beta_i - \delta_i \geq 0$, $\sigma_i - \delta_i \geq 0$, and $\alpha_i, \beta_i, \sigma_i, \delta_i \in \{0, 1, 2, \ldots, 255\}$.

In an embodiment of the first aspect, the basic colors include cyan, magenta and yellow.

In an embodiment of the first aspect, the color coding system further comprises a color manipulation module arranged to manipulate the numerical codes so as to determine one or more target colors associated with one or more baseline colors in the color space.

In an embodiment of the first aspect, the color manipulation module is arranged to determine one or more relationships among multiple colors in the color space.

In an embodiment of the first aspect, the one or more relationships include a complementary relationship, and wherein m colors are complementary colors if $\alpha_1 + \alpha_2 + \ldots + \alpha_m = \beta_1 + \beta_2 + \ldots + \beta_m = \sigma_1 + \sigma_2 + \ldots + \sigma_m$ for all the m colors $p_1^{\alpha_1} p_2^{\beta_1} p_3^{\sigma_1}, p_1^{\alpha_2} p_2^{\beta_2} p_3^{\sigma_2}, \ldots, p_1^{\alpha_m} p_2^{\beta_m} p_3^{\sigma_m}$.

In an embodiment of the first aspect, the one or more relationships include a monochromatic relationship between the target color and the baseline color, In an embodiment of the first aspect, two colors $p_1^{\alpha_1} p_2^{\beta_1} p_3^{\sigma_1}$ and $p_1^{\alpha_2} p_2^{\beta_2} p_3^{\sigma_2}$ are monochromatic if the two colors have the same hue ratio.

In an embodiment of the first aspect, the two colors are monochromatic if:

$$\frac{\alpha_1}{\beta_1} = \frac{\alpha_2}{\beta_2} \text{ for } \sigma_1 = \sigma_2 = 0; \text{ or}$$

$$\frac{\alpha_1}{\sigma_1} = \frac{\alpha_2}{\sigma_2} \text{ for } \beta_1 = \beta_2 = 0; \text{ or}$$

$$\frac{\beta_1}{\sigma_1} = \frac{\beta_2}{\sigma_2} \text{ for } \alpha_1 = \alpha_2 = 0.$$

In an embodiment of the first aspect, the manipulation module is arranged to determine a mixture color based on two or more colors in the color space.

In an embodiment of the first aspect, the mixture color is a multiplication of the all the integers representing each of the two or more colors.

In an embodiment of the first aspect, the mixture color based on n colors is represented as $M(1, 2, 3, \ldots, n)$, wherein $M(1, 2, 3, \ldots, n) = p_1^{\Sigma_1^n \alpha_k} p_2^{\Sigma_1^n \beta_k} p_3^{\Sigma_1^n \sigma_k}$.

In an embodiment of the first aspect, the color coding system further comprises a conversion module arranged to convert the numerical code representing a target color in the color space to an alternative color code in an alternative color representation, or vice versa.

In an embodiment of the first aspect, the alternative color representation is CMYK color representation.

In an embodiment of the first aspect, the conversion module is arranged to perform conversion according to a first conversion relationship of:

$$f(c_i, m_i, y_i, k_i) = \left[ p_1^{c_i - k_i} p_2^{m_i - k_i}, p_3^{y_i - k_i}, p_1 p_2 p_3^{k_i} \right]^{\frac{255}{99}},$$

wherein the target color i in the CMYK color representation is represented as #$c_i$, $m_i$, $y_i$, $k_i$, and wherein $c_i$, $m_i$, $y_i$, $k_i \in \{0, 1, 2, \ldots, 99\}$ and wherein $k_i = \text{Min}\{c_i, m_i, y_i\}$.

In an embodiment of the first aspect, the alternative color representation is RGB color representation.

In an embodiment of the first aspect, the conversion module is arranged to perform conversion according to a second conversion relationship of:

$$q(r_i, g_i, b_i) = q'(r_i, g_i, b_i, d_i) = p_1^{255-r_i-d_i} p_2^{255-g_i-d_i} p_3^{255-b_i-d_i} p_1 p_2 p_3^{d_i},$$

wherein the target color i in the RGB color representation is represented as Δ $r_i$, $g_i$, $b_i$, wherein $r_i$, $g_i$, $b_i \in \{0, 1, 2, 3, \ldots, 255\}$, and wherein di=Min$\{255-r_i, 255-gi, 255-b_i\}$ representing the level of white in the RGB color representation.

In an embodiment of the first aspect, the alternative color representation is HSV color representation.

In an embodiment of the first aspect, the conversion module is arranged to perform conversion according to a third conversion relationship of:

$$t(h_i, s_i, v_i) = p_1^{-r_i + \left(\frac{255}{100}\right)s_i} p_2^{-g_i + \left(\frac{255}{100}\right)s_i} p_3^{-b_i + \left(\frac{255}{100}\right)s_i} p_1 p_2 p_3^{255-\left(\frac{255}{100}\right)s_i},$$

wherein the target color i in the HSV color representation is represented as * $h_i$ $s_i$ $v_i$; wherein $h_i \in \{0°, 1°, 2°, 3°, \ldots, 360°\}$, $s_i \in \{0, 1\%, 2\%, \ldots, 100\%\}$ and $v_i \in \{0, 1\%, 2\%, \ldots, 100\%\}$; and wherein:

$$100 - s_i = \text{Min}(255 - r_i, 255 - g_i, 255 - s_i) \geq 0;$$

$$\text{for } g_i \geq b_i, 1° \leq h_i = 360° - \frac{30°}{128}(255 - r_i + g_i + b_i) \leq 180° \text{ or}$$

$$\text{for } g_i < b_i, 181° \leq h_i = \frac{30°}{128}(255 - r_i + g_i + b_i) \leq 360°; \text{ and}$$

$$v_i = [\text{Max}(ri, gi, bi)]\frac{100}{255}.$$

In an embodiment of the first aspect, the color coding system further comprises a color fitting module arranged to convert a first color in a first color representation to a second color in a second color representation; wherein renderings generated by the first color and by the second color are substantially equivalent to each other.

In an embodiment of the first aspect, the color fitting module is arranged to obtain the first color in the first color representation by combining two or more available colors in the second color representation.

In an embodiment of the first aspect, the color fitting module is arranged to determine a mixing weight of each of the two or more available colors in the second color representation.

In an embodiment of the first aspect, the color fitting module is further arranged to determine the mixing weights based on linear programming so as to minimize a difference between the first color and the second color.

In an embodiment of the first aspect, the color fitting module is further arranged to determine the mixing weights based on a minimum difference between each of the basic colors of the first color and equivalent color components in the first color representation of the second color obtained by a combination of the two or more available colors.

In accordance with a second aspect of the present invention, there is provided a color processing system comprising a processing module arranged to process information associated with a color code, wherein the color code includes at least one numerical codes mapped by the color mapper of the color coding system in accordance with the first aspect.

In an embodiment of the second aspect, each of the plurality of numerical codes is arranged to represent a unique color in a color space.

In an embodiment of the second aspect, the plurality of numerical codes are integers calculated based on a multiplication of prime numbers.

In accordance with a third aspect of the present invention, there is provided a method of converting color codes, comprising the steps of: converting a first color code representing a target color in a first color representation to a second color code representing the target color in a second color representation, or vice versa; wherein the first color code includes a numerical code of an integer determined based on a combination of prime numbers.

In an embodiment of the third aspect, the integer is calculated based on a multiplication of prime numbers.

In an embodiment of the third aspect, the integer is obtain by a multiplication of all color components $p_i^j$ and a darkness level component of the first color, wherein each $p_i$ is the prime number denoting each of the basic colors i, and j represents an intensity of each of the color components $p_i$; and wherein the darkness level component is associated with a combination of all of the color components $p_i^j$.

In an embodiment of the third aspect, the first color i is represented by the integer denoted by I (i), and follows a relationship of I (i)=$p_1^{\alpha_i-\delta_i} p_2^{\beta_i-\delta_i} p_3^{\sigma_i-\delta_i} p_1 p_2 p_3^{\delta_i}$, wherein $\delta_i = \text{min}(\alpha_i, \beta_i, \sigma_i)$, $\alpha_i - \delta_i \geq 0$, $\beta_i - \delta_i \geq 0$, $\sigma_i - \delta_i \geq 0$, and $\alpha_i, \beta_i, \sigma_i, \delta_i \in \{0, 1, 2, \ldots, 255\}$.

In an embodiment of the third aspect, the second color representation is CMYK color representation.

In an embodiment of the third aspect, the method comprises the steps of performing conversion according to a first conversion relationship of:

$$f(c_i, m_i, y_i, k_i) = \left[p_1^{c_i-k_i}, p_2^{m_i-k_i}, p_3^{y_i-k_i}, p_1 p_2 p_3^{k_i}\right]^{\frac{255}{99}},$$

wherein the target color i in the CMYK color representation is represented as #$c_i$, $m_i$, $y_i$, $k_i$, and wherein $c_i$, $m_i$, $y_i$, $k_i \in \{0, 1, 2, \ldots, 99\}$ and wherein $k_i = \text{Min}\{c_i, m_i, y_i\}$.

In an embodiment of the third aspect, the second color representation is RGB color representation.

In an embodiment of the third aspect, the method comprises the step of performing conversion according to a second conversion relationship of:

$$q(r_i, g_i, b_i) = q'(r_i, g_i, b_i, d_i) = p_1^{255-r_i-d_i} p_2^{255-g_i-d_i} p_3^{255-b_i-d_i} p_1 p_2 p_3^{d_i},$$

wherein the target color i in the RGB color representation is represented as Δ $r_i$, $g_i$, $b_i$, wherein $r_i$, $g_i$, $b_i \in \{0, 1, 2, 3, \ldots, 255\}$, and wherein di=Min$\{255-r_i, 255-gi, 255-b_i\}$ representing the level of white in the RGB color representation.

In an embodiment of the third aspect, the second color representation is HSV color representation.

In an embodiment of the third aspect, the method comprises the steps of performing conversion according to a third conversion relationship of:

$$t(h_i, s_i, v_i) = p_1^{-r_i + \left(\frac{255}{100}\right)s_i} p_2^{-g_i + \left(\frac{255}{100}\right)s_i} p_3^{-b_i + \left(\frac{255}{100}\right)s_i} p_1 p_2 p_3^{255-\left(\frac{255}{100}\right)s_i},$$

wherein the target color i in the HSV color representation is represented as * $h_i$ $s_i$ $v_i$; wherein $h_i \in \{0°,1°,2°,3°, \ldots, 360°\}$, $s_i \in \{0, 1\%, 2\%, \ldots, 100\%\}$ and $v_i \in \{0, 1\%, 2\%, \ldots, 100\%\}$; and wherein:

$$100 - s_i = \text{Min}(255 - r_i, 255 - g_i, 255 - s_i) \geq 0;$$

$$\text{for } g_i \geq b_i, 1° \leq h_i = 360° - \frac{30°}{128}(255 - r_i + g_i + b_i) \leq 180° \text{ or}$$

$$\text{for } g_i < b_i, 181° \leq h_i = \frac{30°}{128}(255 - r_i + g_i + b_i) \leq 360°; \text{ and}$$

$$v_i = [\text{Max}(ri, gi, bi)]\frac{100}{255}.$$

In an embodiment of the third aspect, the prime numbers include at least 2, 3 and 5.

In an embodiment of the third aspect, each of the prime numbers represents a respective basic color of the color space, and wherein the basic colors include cyan, magenta and yellow.

In accordance with a fourth aspect of the present invention, there is provided a method of mixing colors comprising the step of determining a target color based on two or more colors in a color space; wherein each of the target color and the two or more colors is represented as numerical code of an integer determined based on a combination of prime numbers.

In an embodiment of the fourth aspect, the integer is calculated based on a multiplication of prime numbers.

In an embodiment of the fourth aspect, the integer is obtain by a multiplication of all color components $p_i^j$ of each of the target color and the two or more colors, wherein each $p_i$ is the prime number denoting each of the basic colors i, and j represents an intensity of each of the color components $p_i$.

In an embodiment of the fourth aspect, the target color i is represented by the integer denoted by I (i), and follows a relationship of I $(i) = p_1^{\alpha_i} p_2^{\beta_i} p_3^{\sigma_i}$, wherein the intensities of each of the color components are represented by $\alpha_i, \beta_i, \sigma_i \in \{0, 1, 2, \ldots, 255\}$.

In an embodiment of the fourth aspect, the target color is determined by a multiplication of the all the integers representing each of the two or more colors.

In an embodiment of the fourth aspect, the mixture color based on n colors is represented as $M(1, 2, 3, \ldots, n)$, wherein $M(1, 2, 3, \ldots, n) = p_1^{\Sigma_1^n \alpha_k} p_2^{\Sigma_1^n \beta_k} p_3^{\Sigma_1^n \sigma_k}$.

In an embodiment of the fourth aspect, the prime numbers include at least 2, 3 and 5.

In an embodiment of the fourth aspect, each of the prime numbers represents a respective basic color of the color space, and wherein the basic colors include cyan, magenta and yellow.

In an embodiment of the fourth aspect, the method further comprises the step of converting the target color equals to a first color in a first color representation to a second color in a second color representation; wherein renderings generated by the first color and by the second color are substantially equivalent to each other.

In an embodiment of the fourth aspect, the method further comprises the step of obtaining the first color in the first color representation by combining two or more available colors in the second color representation.

In an embodiment of the fourth aspect, the method further comprises the step of determining a mixing weight of each of the two or more available colors in the second color representation.

In an embodiment of the fourth aspect, the method further comprises the step of determining the mixing weights based on linear programming so as to minimize a difference between the first color and the second color.

In an embodiment of the fourth aspect, the method further comprises the step of determining the mixing weights based on a minimum difference between each of the basic colors of the first color and equivalent color components in the first color representation of the second color obtained by a combination of the two or more available colors.

In accordance with a fifth aspect of the present invention, there is provided a color mixer comprising a processing module arranged to perform a method of mixing colors in accordance with the fourth aspect; and a color renderer arranged to render the target color.

In an embodiment of the fifth aspect, the color renderer includes a color paint mixer.

In an embodiment of the fifth aspect, the color renderer includes an electrical display unit.

In an embodiment of the fifth aspect, the color renderer includes a printer or a component in a printer.

In accordance with a sixth aspect of the present invention, there is provided a color coding method comprising the steps of: mapping a plurality of colors with a plurality of numerical codes, wherein the each of the plurality of numerical codes is a unique integer determined based on a combination of prime numbers.

In an embodiment of the sixth aspect, the method further comprises the step of representing a unique color in a color space with each of the plurality of numerical codes.

In an embodiment of the sixth aspect, the plurality of numerical codes are integers calculated based on a multiplication of prime numbers.

In an embodiment of the sixth aspect, the method comprises the step of representing a respective basic color of the color space with each of the prime numbers.

In an embodiment of the sixth aspect, the method comprises the step of obtaining the integer by multiplying all color components $p_i^j$, wherein each $p_i$ is the prime number denoting each of the basic colors i, and j represents an intensity of each of the color components $p_i$.

In an embodiment of the sixth aspect, the method comprises the step of representing the unique color i as the integer denoted by I $(i) = p_1^{\alpha_i} p_2^{\beta_i} p_3^{\sigma_i}$, wherein $\alpha_i, \beta_i, \sigma_i \in \{0, 1, 2, \ldots, 255\}$.

In an embodiment of the sixth aspect, the basic colors includes cyan, magenta and yellow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which.

DETAILED DESCRIPTION

Figure 1:
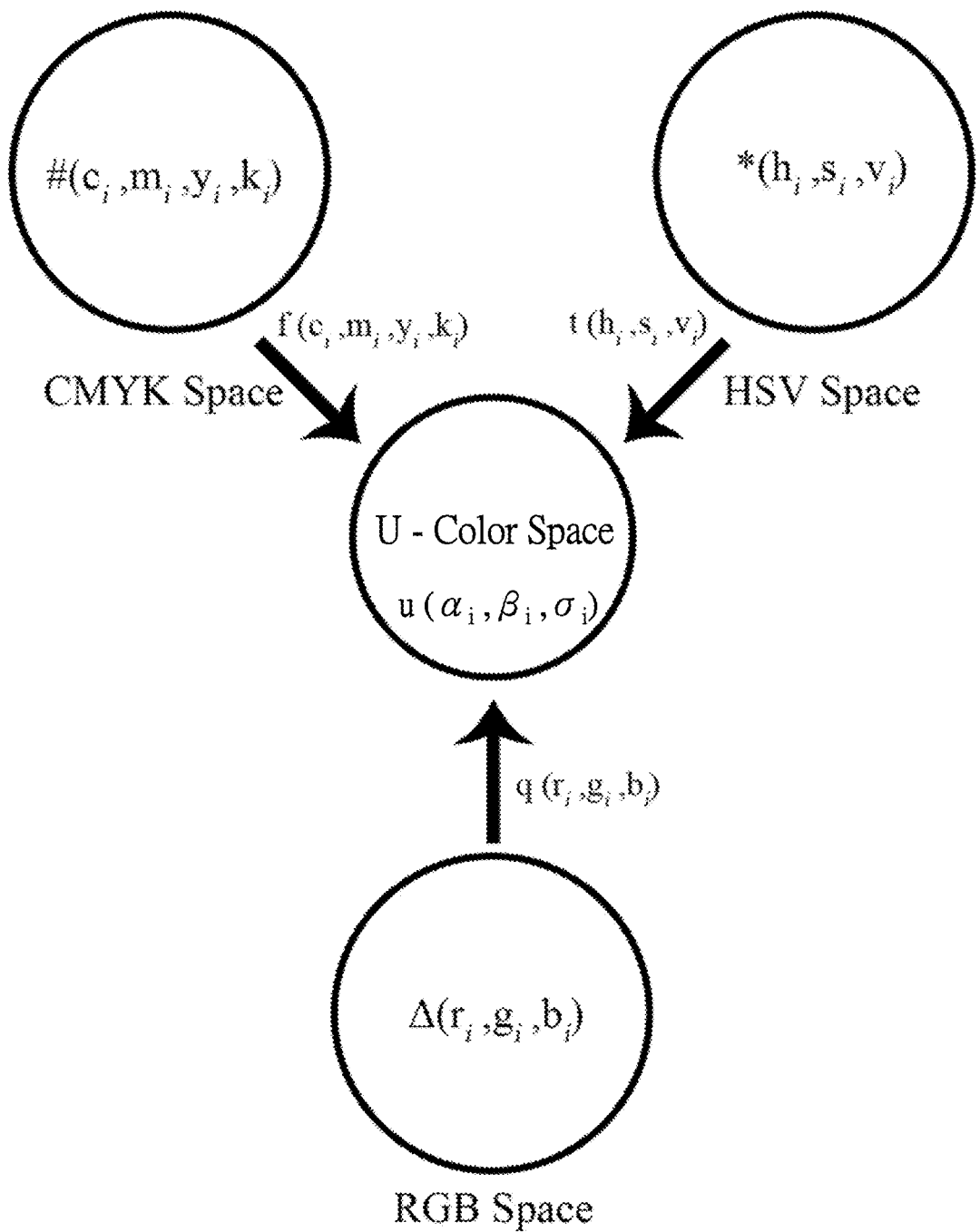
FIG. 1 is an illustration of the color coding method in accordance with an embodiment of the present invention, the color coding method being used to convert colors in any one of the RGB space, CMYK space, and HSV space with different conversion functions.

The inventors have, through their own research, trials and experiments, devised that color coding methods such as RGB, CMYK, and HSV color methods may be used in different applications. However, owing lack powerful integration frame, these methods may be difficult in some applications. For example, it may be difficult to: i) convert a RGB color into a unique CYMK color; ii) blend multiple HSV colors to paint a coloured object; or iii) print a target RGB color using a number of available CMYK colors.

In some example color systems, the color codes and color conversions may be specified as follows.

In a RGB system, each of R(red), G(green), B(blue) colors has 256 values expressed as [0,1, 2, ..., 255], and is coded as (r, g, b).

In a CMYK system, each of C(Cyan), M(Mageton), Y(Yellow), K(Gray) has 100 levels expressed as [0%, 1%,2%, ..., 99%] and is coded as (c, m, y, k).

In a HSV system, H(hue) has 360 degrees expressed as [0°,1°, ..., 360°], both S(saturation) and V(value) have 100 levels expressed as [0%,1%, ..., 100%].

In one example embodiment, a color conversion between RGB and CMYK may be represented as:

$$r=255(1-c/100)(1-k/100),$$

$$g=255(1-m/100)(1-k/100),$$

$$b=255(1-y/100)(1-k/100).$$  Expression (1):

In an alternative example embodiment, a color conversion between RGB and HSV may be represented as:

$(r',g',b')=(r/255,g/255,b/255)$, and where
max=Max$\{r',g',b'\}$, and min=Min$\{r',g',b'\}$,
where: Expression (2):

For the value of h, if max = min, $h = 0°$;

if max = $r'$, $g' \geq b'$, $h = 60° \times \left(\frac{g'-b'}{\max-\min}\right)$;

if max = $r'$, $g' < b'$, $h = 60° \times \left(\frac{g'-b'}{\max-\min}\right) + 360°$;

if max = $g'$, $h = 60° \times \left(\frac{b'-r'}{\max-\min}\right) + 120°$; or if max = $b'$, $h = 60° \times \left(\frac{r'-g'}{\max-\min}\right) + 240°$.

For the value of s, if max = 0, $s = 0$; otherwise $s = 1 - \frac{\min}{\max}$.

For the value of v, v=max.

There may be deficiencies of these example color systems. Firstly, unique conversion of the color may be difficult. Different colors in a system may be converted into the same color of another system. For instance, consider Color A, Color B, and Color C in CMYK system, where $(c_A, m_A, y_A, k_A)$=(56 28 28 0), $(c_B, m_B, y_B, k_B)$=(39 0 0 28) and $(c_C, m_C, y_C, k_C)$=(45 10 10 20). By using Expression (1), all Color A, Color B and Color C are converted into the same RGB color (r, g, b)=(112 184 184). The reason of causing this bias is because Expression (1) cannot support one-to-one mapping between CMYK and RGB.

Secondly, it may be difficult to obtain a mixture of colors based on these expressions. For example, RGB, CMYK, and HSL/HSV systems do not support mixing of more than two colors, since there are no explicit merge functions or operations. For instance, giving three HSV colors expressed in Expression (2), it is not possible to know the resulting color of mixing these three colors. In addition, Expression (2) may be too complicated for value manipulations.

In addition, these color system does not support easy color blending using available colors. For example, given a target color in RGB (or HSV) showing on a color rendering apparatus, current color systems do not support blend existing CMYK colors closing to the target color.

Without wishing to be bound by theory, the inventors devise that these deficiencies may be owing to the lack of a universal frame to bridge different color systems such as RGB, CMYK, and HSV.

Thus, it may be preferable to provide a universal frame having a common color space. Each color in RGB, CMYK, and HSV may be mapped into a unique color in this common space via a unique function. More preferably, under such a universal frame, the colors of various systems can be encoded, exchanged, mixed uniquely and precisely.

In accordance with an embodiment of the present invention, there is provided a color coding system comprising a color mapper arranged to map a plurality of colors with a plurality of numerical codes, wherein the each of the plurality of numerical codes is a unique integer determined based on a combination of prime numbers.

In this example, the colors are represented in form of unique integers, such that the colors may be easily manipulated based on computational functions. For example, a result associated with mixing of multiple source colors to form a new color may be computed based on the numerical codes of the source colors, or a result associated decomposing a certain color to one or more basic colors in the color space may also be computed, by manipulating the numerical codes representing these colors using computational functions.

In one exemplary embodiment, the universal color coding system may be abbreviated as "U-Color" which may integrate alternative color representations such as RGB, CMYK, and HSV, where all colors in a color space may be converted, exchanged and manipulated flexibly.

Preferably, the plurality of numerical codes are integers calculated based on a multiplication of prime numbers, wherein each of the prime numbers represents a respective basic color of the color space. For example, in RGB color representation, the basic colors are red, green and blue whereas in CYMK, the basic colors are cyan, yellow and magenta.

Based on prime-number-theory, U-Color creates an integer space where each color has a unique integer number. Preferably, U-Color may uses primes 2, 3, and 5 to represent cyan, magenta and yellow respectively. In addition, their products, i.e. 6, 15, 10, and 30 may represent blue, red, green, and gray. Alternatively, other prime numbers may be used instead. In this disclosure, the prime numbers are denoted as $p_i$ representing i basic colors or color components.

In addition, based on prime-number-theory, the intensity of each of the color components $p_i$ may be represented as indices j of the prime number $p_i$, i.e. $p_i^j$, therefore the integer is obtain by a multiplication of all color components $p_i^j$ with different intensities j.

For example, a color may be represented as an integer $2^\alpha 3^\beta 5^\sigma$ for $\alpha, \beta, \sigma$ be integers within 0 and 255. Based on this representation, more than 16 million colors may be mapped by the color mapper. The mixture of multiple colors can also be manipulated conveniently. Alternatively, different number of i and j may be used in different embodiments such that the color mapper may map a different number of colors in a color space. For example, when j is in the range of 0-63, the color mapper may map around 26 thousands colors based on 3 basic colors $p_i$.

Preferably, the integer or the numerical code may be further manipulated mathematically using different color functions. The color functions for RGB, CMYK, and HSV may be expressed respectively as q (r, g, b), f (c, m, y, k) and t (h, s, v), and the colors may be converted based on the relationship of $2^\alpha 3^\beta 5^\sigma$=f (c, m, y, k)=t (h, s, v)=q (r, g, b).

With reference to FIG. 1, the color coding system 100 may be used to convert colors in any one of the RGB space, CMYK space, and HSV space. In order to bridge colors in these three spaces, the universal color space (U-Color) may be referenced, which composed of all colors in RGB, CMYK, and HSV. Preferably, each color has a unique integer number.

For reference only, the color codes and the mapping functions associated with the colors may be represented as follows:

Color Codes:
  u ($\alpha_i, \beta_i, \sigma_i$): the universal code of Color i in U-Color
  $\Delta$ ($r_i, g_i, b_i$): the code of color i in RGB
  # ($c_i, m_i, y_i, k_i$): the code of color i in CMYK
  * ($h_i, s_i, v_i$): the code of color i in HSV Color Mapping Functions:
  I(i)≡I($\alpha_i, \beta_i, \sigma_i$): the integer value of i'th color in u($\alpha_i, \beta_i, \sigma_i$), e.g. I($\alpha_i, \beta_i, \sigma_i$)=$p_1^{\alpha_i} p_2^{\beta_i} p_3^{\sigma_i}$
  q($r_i, g_i, b_i$): the RGB function of mapping ($r_i, g_i, b_i$) to v($\alpha_i, \beta_i, \sigma_i$)
  f($c_i, m_i, y_i, k_i$): the function of mapping ($c_i, m_i, y_i, k_i$) to v ($\alpha_i, \beta_i, \sigma_i$)
  t($h_i, s_i, v_i$): the function of mapping ($h_i, s_i, v_i$) to v ($\alpha_i, \beta_i, \sigma_i$)

Preferably, each of the plurality of numerical codes is arranged to represent a unique color in a color space. Effectively, for a color i, all these functions have the same integer value, described as I($\alpha_i, \beta_i, \sigma_i$)=q($r_i, g_i, b_i$)=f($c_i, m_i, y_i, k_i$)=t($h_i, s_i, v_i$), this is the universality feature of the color coding system.

In addition, two different color i and j have different corresponding values, i.e. I($\alpha_i, \beta_i, \sigma_i$)≠I ($\alpha_j, \beta_j, \sigma_j$), q($r_i, g_i, b_i$)≠q($r_j, g_j, b_j$), and f($c_i, m_i, y_i, k_i$)≠f($c_j, m_j, y_j, k_j$), and t($h_i, s_i, v_i$)≠t($h_j, s_j, v_j$). This is the uniqueness feature of the color coding system.

Preferably, the color may be mixed, and the function for mixing different colors is represented as a multiplication product of the prime numbers representing the basic colors. The mixturability feature of the color coding system may be described as follows.

Firstly, a set of three prime numbers may be chosen to represent three original/basic colors. For example, $p_1$=2, $p_2$=3, and $p_3$=5 may be chosen to represent Cyan, Mageton, and Yellow respectively. Since 2, 3, and 5 are three smallest prime values, where each of them is independent with other two primes. Then 2×3=6 may represent Blue, 3×5=15 may represent Red, and 2×5=10 may represent Green. Alternatively, other combinations of prime numbers may also be used, and the prime numbers may represent other basic colors in other color representations.

These three integers 6, 10, 15 are the multiplication of two primes in (2, 3, 5), which implies these three colors are equally composed of two colors in (Cyan, Mageton, Yellow). Then using 2×3×5=30 to represent Gray, which implies Gray is equally composed of three colors Cyan, Mageton, and Yellow.

Preferably, the unique color i may be represented by the integer is denoted by I (i), and follows a relationship of I (i)=$p_1^{\alpha_i} p_2^{\beta_i} p_3^{\sigma_i}$, for the case when there are three basic colors each being represented by a different prime number $p_i$, and the intensities of each of the color components are represented by $\alpha_i, \beta_i, \sigma_i \in \{0,1,2,\ldots,255\}$. In this example, I(i)∈ I, I is the Integer set in U-Color Space, specified as:

$$I=\{2^\alpha 3^\beta 5^\sigma | \alpha,\beta,\sigma \in \{0,1,2,3,\ldots,255\}\} \qquad (3)$$

and the number of integers in I is 256×256×256=16,777,216 each represent a unique color in the color space.

Alternatively, the unique color code may be obtained based on a slightly modified relationship, considering that a combination of three basic colors such as cyan, magenta and yellow would "generate" a black or grey color which represents an intensity of the darkness level component of the color. Based on this the integer value is denoted by I(i), and is represented as:

$$I(i)=p_1^{\alpha_i-\delta_i} p_2^{\beta_i-\delta_i} p_3^{\sigma_i-\delta_i} p_1 p_2 p_3^{\delta_i} \qquad (3a)$$

wherein $\delta_i$ represents an intensity of the darkness level component. wherein $\delta_i$=min($\alpha_i, \beta_i, \sigma_i$), $\alpha_i-\delta_i\geq 0$, $\beta_i-\delta_i\geq 0$, $\sigma_i-\delta_i\geq 0$, and $\alpha_i, \beta_i, \sigma_i, \delta_i \in \{0,1,2,\ldots,255\}$.

Figure 2:
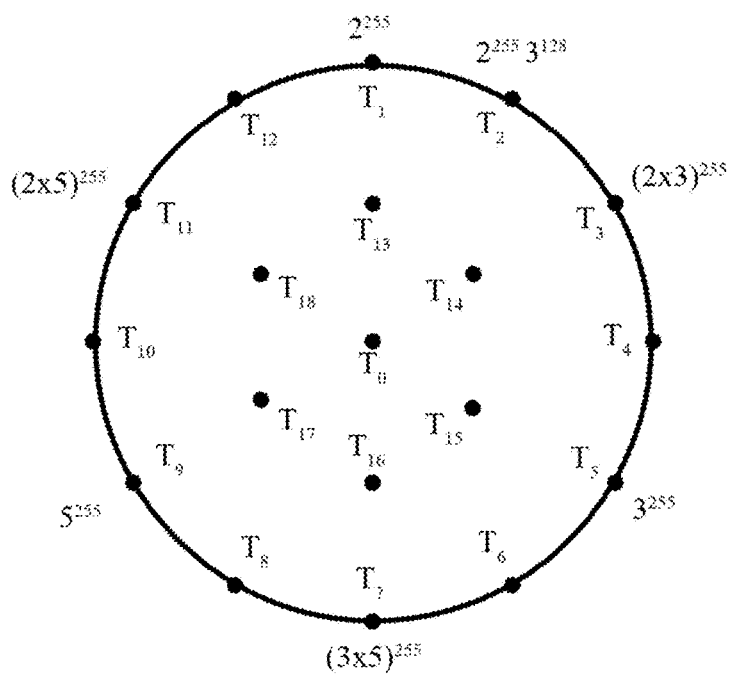
FIG. 2 is a circle-bar graph showing a number of sample points of the set S on the graph, each of the points represents a unique color in the color coding method of FIG. 1.
Figure 2:
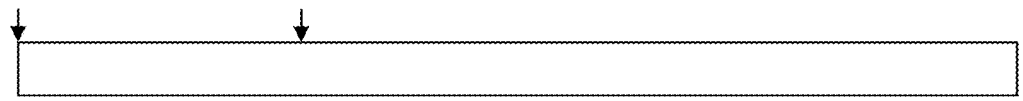

With reference to FIG. 2 and the following tables, set S can also be visualized on a 2D graph, e.g. a circle-bar graph 200, and represent points of the following relations:

$$p_1=2, p_2=3, p_3=5$$

$$I(i)=2^{\alpha_i-\delta_i} 3^{\beta_k-\delta_i} 5^{\sigma_i-\delta_i} 30^{\delta_i}$$

$$\delta=\min(\alpha_i,\beta_i,\sigma_i), \text{ and } \alpha_i,\beta_i,\sigma_i,\delta_i \in \{0,1,2,\ldots,255\}$$

$$S=\{0,1,2,3,5,2^2,2\times 3,3^2,2^2 3, 2\times 5,\ldots,2^{255}\times 3^{255}\times 5^{255}\}$$

Preferably, the value $2^\alpha 3^\beta 5^\sigma$ can be re-written as $2^\alpha 3^\beta 5^\sigma = 2^{\alpha-\delta} 3^{\beta-\delta} 5^{\sigma-\delta} 30^\delta$, where $\beta$=Min ($\alpha, \beta, \sigma$), and $\alpha-\delta\geq 0$, $\beta-\delta\geq 0$, $\sigma-\delta\geq 0$, $\alpha, \beta, \sigma, \delta \in \{0,1,2,\ldots,255\}$. Each value in I can then be represented by a pair of points ($T_i, T_i'$) on the circle-bar graph, where $T_i=2^{\alpha_i} 3^{\beta_i} 5^{\sigma_i}$ is the integer point on the circle, and $T_i'=30^{\delta_i}$ is the integer point on the bar.

For instance, an integer $2^{255}$ is represented by a pair point ($T_1, T_1'$), where $T_1=2^{255}$ is on the circle and $T_1'=30^0$ is on the bar. An integer $2^{255} 3^{128}$ is represented by a pair point ($T_2, T_2'$), where $T_2=2^{255} 3^{128}$ is on the circle and $T_2'=30^0$ is on the bar. Suppose there is an arbitrary integer $2^{128} 5^{128} 30^{50}$, which is represented by a pair point ($T_{19}, T_{19}'$), where $T_{19}=2^{128} 5^{128}$ and $T_{19}'=30^{50}$; then the circle location of $T_{19}$ is the same as in $T_{18}$, and point $T_{19}'$ is on the bar.

Table 1 (a)

| | | 2 | | | |
|---|---|---|---|---|---|
| 3 | $2^0$ | $2^1$ | $2^2$ | ... | $2^{255}$ |
| $3^0$ | 1 | 2 | 4 | ... | $2^{255}$ |
| $3^1$ | 3 | 2×3 | $2^2$×3 | ... | $2^{255}$×3 |
| $3^2$ | $3^2$ | 2×$3^2$ | $2^2$×$3^2$ | ... | $2^{255}$×$3^2$ |
| ... | ... | ... | ... | | ... |
| $3^{255}$ | $3^{255}$ | 2×$3^{255}$ | $2^2$×$3^{255}$ | ... | $2^{255}$×$3^{255}$ |

Table 1 (b)

| | | 5 | | | |
|---|---|---|---|---|---|
| 3 | $5^0$ | $5^1$ | $5^2$ | ... | $5^{255}$ |
| $3^0$ | 1 | 5 | $5^2$ | ... | $5^{255}$ |
| $3^1$ | 3 | 3×5 | 3×$5^2$ | ... | 3×$5^{255}$ |
| $3^2$ | $3^2$ | $3^2$×5 | $3^2$×$5^2$ | ... | $3^2$×$5^{255}$ |
| ... | ... | ... | ... | | ... |
| $3^{255}$ | $3^{255}$ | $3^{255}$×5 | $3^{255}$×$5^2$ | ... | $3^{255}$×$5^{255}$ |

TABLE 1(c)

| | | 5 | | | |
|---|---|---|---|---|---|
| 2 | $5^0$ | $5^1$ | $5^2$ | ... | $5^{255}$ |
| $2^0$ | 1 | 5 | $5^2$ | ... | $5^{255}$ |
| $2^1$ | 2 | 2×5 | 2×$5^2$ | ... | 2×$5^{255}$ |
| $2^2$ | $2^2$ | $2^2$×5 | $2^2$×$5^2$ | ... | $2^2$×$5^{255}$ |
| ... | ... | ... | ... | | ... |
| $2^{255}$ | $2^{255}$ | $2^{255}$×5 | $2^{255}$×$5^2$ | ... | $2^{255}$×$5^{255}$ |

Figure 3:
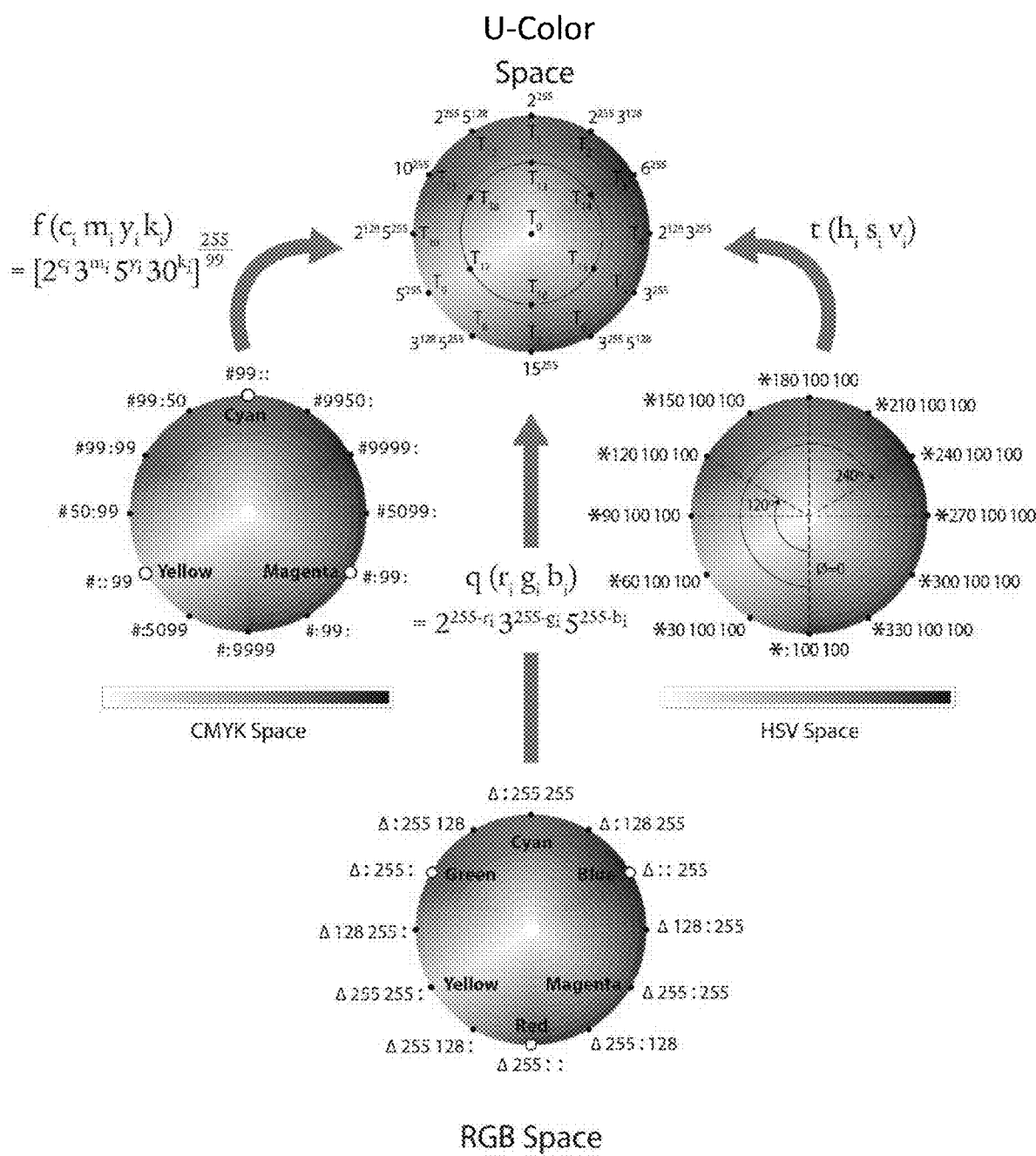
FIG. 3 is an illustration of a plurality of unique colors and the associated color codes in different color representation, and the conversions functions for converting the color codes between the color coding method of FIG. 1 and one of the three alternative color representations.

With reference to FIG. 3, color codes in different color representations may be converted to an alternative color code, e.g. from RGB to CYMK via the color coding system 300 in accordance with embodiments of the present invention.

Preferably, the color coding system may further comprise a conversion module arranged to convert the numerical code representing a target color in the color space to an alternative color code in an alternative color representation, or vice versa.

In one embodiment, the alternative color representation may be CMYK color representation. Let Color i in CMYK be encoded as #$c_i$, $m_i$, $y_i$, $k_i$, where $c_i$, $m_i$, $y_i$, $k_i \in \{0,1,2,\ldots,99\}$ and $k_i=\text{Min}\{c_i, m_i, y_i\}$. Then, the conversion module is arranged to perform conversion according to a first conversion relationship of:

$$f(c_i, m_i, y_i, k_i) = \left[p_1^{c_i-k_i}, p_2^{m_i-k_i}, p_3^{y_i-k_i}, p_1p_2p_3^{k_i}\right]^{\frac{255}{99}} \quad (4)$$

wherein the target color i in the CMYK color representation is represented as #$c_i$, $m_i$, $y_i$, $k_i$, and wherein $c_i$, $m_i$, $y_i$, $k_i \in \{0, 1, 2, \ldots, 99\}$ and wherein $k_i=\text{Min}\{c_i, m_i, y_i\}$.

For instance, when the prime numbers used are 2, 3 and 5, color cyan is encoded as #(99 : : :), where ":" means 0. Then $$f(99 : : :) = [2^{99}]^{\frac{255}{99}} = 2^{255}.$$

Similarly, Color blue is encoded as #(99 99 : :), and $$f(99\ 99\ :\ :) = [2^{99}3^{99}]^{\frac{255}{99}}.$$

A blue color with brightness level $k_i$=10 can be encoded as #(99 99 : 10) and $$f(99\ 99\ :\ 10) = [2^{99}3^{99}30^{10}]^{\frac{255}{99}} = 2^{255}3^{255}30^{25}.$$

In another embodiment, the alternative color representation may be RGB color representation. Let Color i in RGB be encoded as Δ $r_i$, $g_i$, $b_i$, where $r_i$, $g_i$, $b_i \in \{0,1,2,3,\ldots 255\}$, and let $d_i=\text{Min}\{r_i, g_i, b_i\}$. Then, the conversion module is arranged to perform conversion according to a second conversion relationship of:

$$q(r_i,g_i,b_i)=q'(r_i,g_i,b_i,d_i)=p_1^{255-r_i-d_i}p_2^{255-g_i-d_i}p_3^{255-b_i-d_i}p_1p_2p_3^{d_i} \quad (5)$$

wherein the target color i in the RGB color representation is represented as Δ $r_i$, $g_i$, $b_i$, wherein $r_i$, $g_i$, $b_i \in \{0,1,2,3,\ldots,255\}$, and wherein $d_i=\text{Min}\{255-r_i, 255-g_i, 255-b_i\}$ representing the level of white in the RGB color representation, e.g. at $d_i$=0, it is "dark" and at $d_i$=255, it is "white".

For instance, when the prime numbers used are 2, 3 and 5, red is encoded as Δ (255, 0, 0) where $d_i=\text{Min}\{255-255, 255-0, 255-0\}=0$, q(255, 0,0)=$2^{255-255-0}3^{255}5^{255}30^0=3^{255}5^{255}$. For a reddish color with d=100, the function q value is q' (155, 0,0, 100)=$2^{255-115-100}3^{255-0-100}5^{255-0-100}30^{100}=3^{155}5^{155}30^{100}$.

In yet another embodiment, the alternative color representation may be HSV color representation. Let Color i in HSV be encoded as * $h_i$ $s_i$ $v_i$ where $h_i \in \{0°,1°,2°,3°,\ldots,360°\}$, $s_i$ (Saturation) $\in \{0, 1\%, 2\%, \ldots, 100\%\}$ and $v_i$ (value) $\in \{0, 1\%, 2\%, \ldots, 100\%\}$. Then the conversion module is arranged to perform conversion according to a third conversion relationship of:

$$t(h_i, s_i, v_i) = p_1^{-r_i+(\frac{255}{100})s_i} p_2^{-g_i+(\frac{255}{100})s_i} p_3^{-b_i+(\frac{255}{100})s_i} p_1p_2p_3^{255-(\frac{255}{100})s_i} \quad (6)$$

wherein the target color i in the HSV color representation is represented as * $h_i$ $s_i$ $v_i$; wherein $h_i \in \{0°,1°,2°,3°,\ldots,360°\}$, $s_i \in \{0, 1\%, 2\%, \ldots, 100\%\}$ and $v_i \in \{0, 1\%, 2\%, \ldots, 100\%\}$; and wherein:

$100 - s_i = \text{Min}(255 - r_i, 255 - g_i, 255 - b_i) \geq 0;$ for $g_i \geq b_i$, $1° \leq h_i = 360° - \frac{30°}{128}(255 - r_i + g_i + b_i) \leq 180°$ or for $g_i < b_i$, $181° \leq h_i = \frac{30°}{128}(255 - r_i + g_i + b_i) \leq 360°$; and $v_i = [\text{Max}(r_i, g_i, b_i)]^{\frac{100}{255}}.$ The following table list 20 sample colors with corresponding integer codes and ($r_i$, $g_i$, $b_i$), ($c_i$, $m_i$, $y_i$, $k_i$), ($h_i$, $s_i$, $v_i$) codes.

Preferably, a universal code may not be the value that needs to be computed but a numerical code to identify an integer, since it is unnecessary to expand a number such as $2^{255}$.

| point | U-Color Code u (α β σ) | U-Color Integer Value I(i) = $2^\alpha 3^\beta 5^\sigma$ | R G B Code Δ (r g b) | C M Y K Code # (c m y k) | H S V Code * (h s v) |
|---|---|---|---|---|---|
| (T$_0$, 0) | u (: : :) | 0 | Δ(255 255 255) | # (: : : :) | *(: : 100) |
| (T$_1$, 0) | u (255 : :) | $2^{255}$ | Δ(: 255 255) | # (99 : : :) | *(180° 100 100) |
| (T$_2$, 0) | u (255 128 :) | $2^{255} 3^{128}$ | Δ(: 128 255) | # (99 50 : :) | *(210° 100 50) |
| (T$_3$, 0) | u (255 255 :) | $6^{255}$ | Δ(: : 255) | # (99 99 : :) | *(240° 100 100) |
| (T$_4$, 0) | u (128 255 :) | $2^{128} 3^{255}$ | Δ(128 : 255) | # (50 99 : :) | *(270° 100 100) |
| (T$_5$, 0) | u (: 255 :) | $3^{255}$ | Δ(255 : 255) | # (: 99 : :) | *(300° 100 100) |
| (T$_6$, 0) | u (: 255 128) | $3^{255} 5^{128}$ | Δ(255 : 128) | # (: 99 50 :) | *(330° 100 100) |
| (T$_7$, 0) | u (: 255 255) | $15^{255}$ | Δ(255 : :) | # (: 99 99 :) | *(0° 100 100) |
| (T$_8$, 0) | u (: 128 255) | $3^{128} 5^{255}$ | Δ(255 128 :) | # (: 50 99 :) | *(30° 100 100) |
| (T$_9$, 0) | u (: : 255) | $5^{255}$ | Δ(255 255 :) | # (: : 99 :) | *(60° 100 100) |
| (T$_{10}$, 0) | u (128 : 255) | $2^{128} 5^{255}$ | Δ(128 255 :) | # (50 : 99 :) | *(90° 100 100) |
| (T$_{11}$, 0) | u (255 : 255) | $10^{255}$ | Δ(: 255 :) | # (99 : 99 :) | *(120° 100 100) |
| (T$_{12}$, 0) | u (255 : 128) | $2^{255} 5^{128}$ | Δ(: 255 128) | # (99 : 50 :) | *(150° 100 100) |
| (T$_{13}$, 0) | u (128 : :) | $2^{128}$ | Δ(: 128 255 255) | # (50 : : :) | *(180° 100 100) |
| (T$_{14}$, 0) | u (128 128 :) | $6^{128}$ | Δ(128 128 255) | # (50 50 : :) | *(240° 100 100) |
| (T$_{15}$, 0) | u (: 128 :) | $3^{128}$ | Δ(255 128 255) | # (: 50 : :) | *(300° 100 100) |
| (T$_{16}$, 0) | u (: 128 128) | $15^{128}$ | Δ(255 128 128) | # (: 50 50 :) | *(0° 100 100) |
| (T$_{17}$, 0) | u (: : 128) | $5^{128}$ | Δ(255 255 128) | # (: : 50 :) | *(60° 100 100) |
| (T$_{18}$, 0) | u (128 : 128) | $10^{128}$ | Δ(128 255 128) | # (50 : 50 :) | *(120° 100 100) |
| (T$_{19}$, 0) | u (178 50 178) | $2^{178} 3^{50} 5^{178}$ | Δ (77 205 77) | # (70 19.6 70) | *(120° 63 80) |

In the example as shown in above table, points (T$_1$, 0) represents "cyan", (T$_3$, 0) represents "blue", (T$_5$, 0) represents "magenta", (T$_7$, 0) represents "red", (T$_9$, 0) represents "yellow" and (T$_{11}$, 0) represents "green".

With reference to FIG. 3, the points T$_0$ to T$_{18}$ in the table may be further located. To simplify the expressions, all these example colors have the brightness value at 0. Take color T$_1$ for instance, T$_1$ is encoded as #99 : : : in CMYK; as Δ(:255 255) in RGB; as *(180 100 100) in HSV; as u(255 : :) in U-Color; where ":" means "0". All these points have level of grey (i.e, K value) at 0.

In this example, considering the color (T$_1$, 0), for instance, I (T$_1$)=$2^{255}$, f (99, 0, 0, 0)=($2^{255}$ $3^0$ $5^0$ $30^0$)=$2^{255}$, and q (0, 255, 255)=($2^{255}$ $3^{255-255}$ $5^{255-255}$)=$2^{255}$.

Since t (180°, 100, 100)=$2^{-r+255}$ $3^{-g+255}$ $5^{-b+255}$ 30°, where $$h = 360° - \frac{30°}{128}(255 - r + g + b) = 180°, \text{ and}$$

$$v = [\text{Max}(r, g, b)]^{\frac{100}{255}} = 100,$$

therefore t (180, 100, 100)=($2^{255}$ $3^0$ $5^0$ $3^{00}$)=$2^{255}$, and σ(T$_1$)=$2^{255}$=f(99, 0, 0, 0)=q(0, 255, 255)=t(180°, 100, 100).

In another example, considering the color (T$_{14}$,0), based on the table above, I (T$_{14}$)=$6^{128}$, Δ (r$_{14}$, g$_{14}$, b$_{14}$)=(128, 128, 255), #(c$_{14}$, m$_{14}$, y$_{14}$, k$_{14}$,)=(50, 50, 0, 0), * (h$_{14}$, s$_{14}$, v$_{14}$)=(240°, 50, 100).

In yet another example, considering the color (T$_{19}$,0) based on the table above, I (T$_{19}$)=$2^{178} 3^{50} 5^{178}$, Δ (r$_{19}$, g$_{19}$, b$_{19}$)=(77, 205, 77), #(c$_{19}$, m$_{19}$, y$_{19}$, k$_{19}$)=(70 20 70 0), which may also be converted as (50 0 50 20).

Further examples of the color u(128 128 :) represented by the U-Color representation in relation to the function q, f, t may be illustrated as follows:

(i) For q(128, 128, 255), d=min(255−128, 255−128, 255−255)=0

Therefore q(128, 128, 255)=$2^{255-128}$ $3^{255-128}$ $5^{255-255}$=$6^{128}$ (ii) For f (50, 50, 0, 0)=($2^{50}$, $3^{50}$)$^{255/100}$=$6^{128}$ (iii)

For t(240°, 50, 100), $$h = 240 = 360° - \frac{30°}{128}(255 - r + g + b), g \leq b$$

$$v = [\text{Max}(r, g, b)]^{\frac{100}{255}} = 100$$

Therefore when r=128, g=128, b=255,
t (240°, 50, 100)=$255^{255-r}$ $3^{255-g}$ $5^{255-b}$=$(2 \times 3)^{128}$ In an alternative example, the conversion among CMYK, RGB and HSV representations is provided.

Given Color i, its conversion among CMYK, RGB, and HSV can be expressed as:

$$I(\alpha_i, \beta_i, \sigma_i) = f(c_i, m_i, y_i, k_i) = g(r_i, g_i, b_i) = t(h_i, s_i, l_i).$$

σ (cyan)=$2^{255}$, and $2^{255} = 2^{\overline{c}_i d_i} 3^{\overline{m}_i - d_i} 5^{\overline{y}_i - d_i} 30^{d_i}$ where $$\overline{c}_i = \frac{255}{99} c_i$$

and d$_i$=0. Therefore c$_i$=99 and (c$_i$,m$_i$,y$_i$,k$_i$)=(99, 0, 0, 0) in CYMK.

$$2^{255} = 2^{255-y_i-d_i} 3^{255-g_i-d_i} 5^{255-b_i-d_i} 30^{d_i}$$

$$\therefore (r_i, g_i, b_i, d_i) = (0, 255, 255, 0) \text{ and}$$

$$(r_i, g_i, b_i) = (0, 255, 255) \text{ in } RGB.$$

$$\because A_i = \left[\frac{30°}{128}(255 - r_i + g_i + b_i)\right] = 180° \text{ and } \overline{d}_i = 255,$$

$$d_i = 0,$$

$$\therefore h_i = 360° - 180° = 180°,$$

$$s_i = 255/255 = 100\%, v_i = 100\% \text{ in } HSV$$

In these examples, the levels or the intensities of the basic color components are 256 ($2^8$) (e.g. in RGB) or 100 (in CMYK). In some example applications, the demand on total number of colors may increase, +for example, the levels of R, G and B in RGB color codes may be "expanded" from 256 to 2×256=512, or the levels of C, M, Y and K in CMYK color codes may be expanded from current 100 to a larger values any may include some additional dyes and inks such as neon colors and metallic colors with an expended color space.

In these alternative examples, the color mapper may be modified as follows:

Firstly, updating the levels of color in u, Δ, #, as:

$u(\alpha_i, \beta_i, \sigma_i)$: the universal code of color i in U-Color, $\alpha_i, \beta_i, \sigma_i \in \{0,1,2, \ldots, 255, 256, \ldots, 512\}$.

$\Delta(r_i, g_i, b_i)$: the code of color i in RGB, $r_i, g_i, b_i \in \{0,1,2, \ldots, 255, 256, \ldots, 512\}$.

$\#(c_i, y_i, m_i, k_i)$: the code of color i in CMYK, $C_i, M_i, Y_i, K_i \in \{0,1,2, \ldots, 99, 100, \ldots, 128\}$.

where 0-99 is for existing levels in current CMYK, and 100-128 is an expended range covering the new or brighter dyes and inks.

$*(r_i, g_i, b_i)$: the code of color i in HSV, that is, $h_i \in \{0°, \ldots, 360°\}, S_i \in \{0, \ldots, 100\%\}, vi \in \{0, \ldots, 100\%\}$, thus keeping the features of intuitive realization in HSV representations.

Secondly, updating the color mapping function of I, g, f and t as:

$I(\alpha_i, \beta_i, \sigma_i): 2^{\alpha i} 3^{\beta i} 5^{\sigma i}$, the integer value of i'th color in $u(\alpha_i, \beta_i, \sigma_i)$, and $\alpha_i, \beta_i, \sigma_i \in \{0,1,2, \ldots, 255, 256, \ldots, 512\}$.

$q(r_i, g_i, b_i) = 2^{512-ri} 3^{512-gi} 5^{512-bi}$.

$f(c_i, m_i, y_i, k_i) = [2^{ci-ki} 3^{mi-ki} 5^{yi-ki} 30^{ki}]^4$, for $c_i, m_i, y_i, k_i \in \{0,1,2, \ldots, 128\}$.

and $$-t(h_i, s_i, v_i) = 2^{-ri+\left(\frac{512}{100}\right)si} 3^{-gi+\left(\frac{512}{100}\right)si} 5^{-bi+\left(\frac{512}{100}\right)si} 30^{512-\left(\frac{512}{100}\right)si}$$

where $100 - S_i = \text{Min}(512 - r_i, 512 - g_i, 512 - b_i) \geq 0$;

for $g_i \geq b_i, 1° \leq h_i = 360° - \frac{30°}{255}(512 - r_i + g_i + b_i) \leq 180°$;

for $g_i < b_i, 181° \leq h_i = \frac{30°}{255}(512 - r_i + g_i + b_i) \leq 360°$, and $V_i = [\text{Max}(r_i, g_i, b_i)]^{\frac{100}{512}}$.

Additionally, the color coding system may further comprise a color manipulation module arranged to manipulate the numerical codes so as to determine one or more target colors associated with one or more baseline colors in the color space.

As discussed above, the numerical codes in the color mapper in the U-Color coding system is based on prime-number-theory and the color components of a color is represented by a number of prime numbers with their intensity represented by the indices of these numbers. Thus different colors may be associated with each other according to different methodical relationships.

Preferably, the color manipulation module is arranged to determine one or more relationships among multiple colors in the color space.

The first possible relationships among multiple colors include a complementary relationship, and wherein m colors are complementary colors if $\alpha_1 + \alpha_2 + \ldots + \alpha_m = \beta_1 + \beta_2 + \ldots + \beta_m = \sigma_1 + \sigma_2 + \ldots + \sigma_m$ for all the m colors $p_1^{\alpha_1} p_2^{\beta_1} p_3^{\sigma_1}, p_1^{\alpha_2} p_2^{\beta_2} p_3^{\sigma_2}, \ldots, p_1^{\alpha_m} p_2^{\beta_m} p_3^{\sigma_m}$. For example, three colors $2^{245} 3^0 5^{10}, 2^{10} 3^{245} 5^0$, and $2^0 3^{10} 5^{245}$ are complementary.

The second possible relationships include a monochromatic relationship between the target color and the baseline color. Two colors $p_1^{\alpha_1} p_2^{\beta_1} p_3^{\sigma_1}$ and $p_1^{\alpha_2} p_2^{\beta_2} p_3^{\sigma_2}$ are monochromatic if the two colors have the same hue ratio, i.e.

$$\frac{\alpha 1}{\beta 1} = \frac{\alpha 2}{\beta 2} \text{ for } \sigma_1 = \sigma_2 = 0; \text{ or}$$

$$\frac{\alpha 1}{\sigma 1} = \frac{\alpha 2}{\sigma 2} \text{ for } \beta_1 = \beta_2 = 0; \text{ or}$$

$$\frac{\beta 1}{\sigma 1} = \frac{\beta 2}{\sigma 2} \text{ for } \alpha_1 = \alpha_2 = 0.$$

For example, $2^{255} 3^{255} 5^0$ and $2^{128} 3^{128} 5^0$ are monochromatic.

Additionally, the manipulation module is arranged to determine a mixture color based on two or more colors in the color space. Recall that a color consisting of multiple basic colors is obtained by multiplying all the prime numbers $p_i^j$, similarly, mixture of multiple colors may be obtained by multiplying all the prime numbers $p_i^j$ in all the individual colors.

In this example, the mixture color is a multiplication of the all the integers representing each of the two or more colors. For example the mixture color based on n colors is represented as $M(1, 2, 3, \ldots, n)$, wherein $M(1, 2, 3, \ldots, n) = p_1^{\Sigma_i^n \alpha_k} p_2^{\Sigma_i^n \beta_k} p_3^{\Sigma_i^n \sigma_k}$.

Denote $M(i, j, l)$ as the function of mixing colors i, j, l in the integer space, which can be formulated as the multiplication of $\sigma(i), \sigma(j)$ and $\sigma(l)$, specified as:

$$(i) \; M(i, j, l) = I(\alpha_i \beta_i \sigma_i) \times I(\alpha_j \beta_j \sigma_j) \times I(\alpha_l \beta_l \sigma_l)$$
$$= p_1^{\alpha_i + \alpha_j + \alpha_l - \delta} p_2^{\beta_i + \beta_j + \beta_l - \delta} p_3^{\sigma_i + \sigma_j + \sigma_l - \delta} p_1 p_2 p_3^\delta$$

where $\alpha_i, \alpha_j, \alpha_l, \beta_i, \beta_j, \beta_l, \sigma_i, \sigma_j, \sigma_l \in \{0 \; 1 \; 2 \; \ldots \; 255\}$, and $\delta = \min\{(\alpha_i + \alpha_j + \alpha_l), (\beta_i + \beta_j + \beta_l), (\sigma_i + \sigma_j + \sigma_l)\}$.

For $p_1 = 2, p_2 = 3, p_3 = 5$, if $(\alpha_i, \beta_i, \sigma_i) = (255, 128, 0), (\alpha_j, \beta_j, \sigma_j) = (128, 255, 0), (\alpha_l, \beta_l, \sigma_l) = (128, 0, 128), \delta = \min\{(255 + 128 + 128), (128 + 255), (128)\} = 128$, then, $M(i, j, l) = 2^{255+128+128-128} 3^{128+255+0-128} 5^{0+0+128-128} 30^{128} = 2^{283} 3^{255} 30^{128}$.

Figure 4:
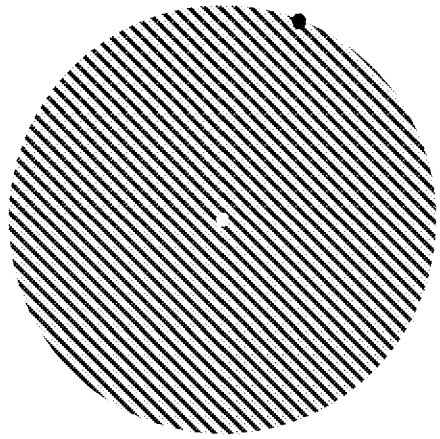
FIG. 4 is a circle-bar graph showing an example result of mixture of multiple colors in accordance with an embodiment of the present invention.
Figure 4:

With reference to FIG. 4, rewriting $M(i, j, l)$ as:

$$M(i, j, l) = \left[2^{\frac{255}{383} \times 383} 3^{\frac{255}{383} \times 255} 30^{\frac{255}{383} \times 128}\right]^{383/255} = [2^{255} 3^{169} 30^{85}]^{1.5},$$

this mixed color can then be illustrated in a circle-bar graph 400, where $[2^{255} 3^{169}]^{1.5}$ is shown on the circle and $[30^{85}]^{1.5}$ is shown on the bar.

Optionally, the color coding system further comprises a color fitting module arranged to convert a first color in a first color representation to a second color in a second color representation; wherein renderings generated by the first color and by the second color are substantially equivalent to each other.

In this example, the color rendering may be produced by a color mixer such as a color paint mixer, an electrical display unit, a printer or a component in a printer.

Two examples are described here to illustrate the manipulation of color fitting in this invention.

In a first example (Example 1), assuming there is a target color encoded as $(r_i, g_i, b_i)$, and a print out of this color via three available CMYK colors $(c_1, m_1, y_1, k_1)$, $(c_2, m_2, y_2, k_2)$ and $(c_3, m_3, y_3, k_3)$ is required, the color fitting module may obtain a "closest" color in RGB obtainable using the available CMYK colors which may not able to mix an absolutely equivalent color.

In Example 1, the color fitting module may determine the mixing weights of each of the available CMYK colors based on linear programming so as to minimize a difference between the first color (target color) and the second color ("closest" color obtainable).

The linear programming problem may be setup as follows:

$$\text{MIN obj}=|255-r_i-\Sigma_1^3 w_j c_j|+|255-g_i-\Sigma_1^3 w_j m_j|+|255-b_i-\Sigma_1^3 w_j y_j|, \text{ where } w_1, w_2, w_3 \geq 0$$

(the symbol "|Q|" means the absolute term of Q)

In Example 1, the color fitting module determines the mixing weights based on a minimum difference between each of the basic colors of the first color and equivalent color components in the first color representation of the second color obtained by a combination of the two or more available colors, i.e. to find the weights on the mixture of three CMYK colors thus to minimize the difference between the target RGB colors and the mixed CMYK colors.

For instance, if $(r_i, g_i, b_i)=(100\ 128\ 128)$ and three CMYK colors $(50\ 50\ 0\ 0)$, $(0\ 30\ 48\ 0)$, and $(0\ 0\ 30\ 20)$ are available to print/render this target RGB color. The color $(0\ 0\ 30\ 20)$ may be represented as $(20\ 20\ 50\ 0)$, then by solving the following linear programming problem:

$$\text{MIN obj}=|100-(50w_1+20\ w_3)|+|128-(50w_1+30\ w_2+20\ w_3)|+|128-(48w_2+50\ w_3)|, w_1, w_2, w_3 \geq 0$$

The optimal solution is $w_1=1.34$, $w_2=0.93$, and $w_3=1.66$, and $\text{obj}=|100-100.2|+|128-66.5-27.9-33.2|+|128-44.64-83|=0.66$.

Based on this result, to render a target color in RGB based on three available CMYK colors, it is preferable to mix 1.34 unit of $(50\ 50\ 0\ 0)$ color with 0.93 unit of $(0\ 30\ 48\ 0)$ and 1.66 unit of $(20\ 20\ 50\ 0)$ color. This may be useful for obtaining a mixture of paint of a certain color based on paints of a number of available colors of a different color space.

In a second example (Example 2), given a target color encoded as $2^\alpha 3^\beta 5^\sigma$, and it is required to print the target color using a set of seven color inks: 2(cyan), 3(magenta), 5(yellow), 6(deep blue), 10(green), 15(red) and 30(black). In addition, considering the unit cost of each of these seven color, respectively denoted as $\$_c, \$_m, \$_y, \$_d, \$_g, \$_r$ and $\$_b$ in this example.

The target color may be obtained by mixing the basic colors in different ways or compositions, in some applications, it may be more preferable to obtain such a color in the most cost-effective way.

Denote $\lambda_c, \lambda_m, \lambda_y, \lambda_d, \lambda_g, \lambda_r$ and $\lambda_b$ as the amount of inks used to print the target color. Mathematically, this problem is to find the optimal combination (solution) of $\lambda_c, \ldots, \lambda_b$ thus to minimize the total cost of printing the target color. The relationship between $\alpha, \beta, \sigma$ and $\lambda_c, \ldots, \lambda_b$ can be expressed as $$2^\alpha 3^\beta 5^\sigma = 2^{\lambda_c} 3^{\lambda_m} 5^{\lambda_y} 6^{\lambda_d} 10^{\lambda_g} 15^{\lambda_r} 30^{\lambda_b}$$

The mathematic program of this problem may than be formulated as:

Minimize: Total cost=$\$_c \lambda_c + \$_m \lambda_m + \$_y \lambda_y + \$_d \lambda_d + \$_g \lambda_g + \$_r \lambda_r + \$_b \lambda_b$ Subject to: $\alpha \ln 2 + \beta \ln 3 + \sigma \ln 5 \approx \lambda_c \ln 2 + \lambda_m \ln 3 + \lambda_y \ln 5 + \lambda_d \ln 6 + \lambda_g \ln 10 + \lambda_r \ln 15 + \lambda_b \ln 30$ where $\alpha, \beta, \sigma$ are integral constants; $\lambda_c, \lambda_m, \ldots, \lambda_b$ are non-negative integer variables Suppose the variables are: $\alpha=10$, $\beta=20$, $\sigma=30$, and $(\$_c, \$_m, \$_y, \$_d, \$_g, \$_r, \$_b)=(0.8, 0.7, 0.6, 0.5, 0.5, 0.4, 0.1)$, Then the optimal solution is obtained to: $(\lambda_c, \lambda_m, \lambda_y, \lambda_d, \lambda_g, \lambda_r, \lambda_b)=(0, 5, 14, 0, 1, 6, 9)$ and total cost is 15.7.

That means, to print the color u(10, 20, 30), the most-effective way is to use 5 units of magenta, 14 units of yellow, 1 unit of green, 6 units of red and 1 unit of black. The required cost is 15.7.

These embodiments may be advantageous in that the color coding system uses codes which are simpler than some other coding system such as the hexadecimal representation and eight-digital representation. Based on the prime-number theory, the numerical codes are compact digits which may include richer information of colors.

Advantageously, the numerical codes provide manipulability of the mapped colors. It is convenient to find related colors and to mix/segregate colors using simple conversion functions. Manipulating tools may be used to merge, edit, and mix colors precisely.

In addition, all the colors may be visibly represented and located on a circle-bar graph or a ring, and the unique color code system may facilitate exchange of color information using a universal platform for different users of the color coding system.

The color coding system may be readily used in the different applications, such as (but not limited to), fashion and apparel design, painting, printing, dying, product and interior design.

In an alternative embodiment of the present invention, features in the abovementioned embodiments may be provided in a color processing system comprising a processing module arranged to process information associated with a color code, wherein the color code includes at least one numerical codes mapped by the color mapper of the color coding system as discussed earlier in this disclosure. The system may also be used to process color information according to any of the abovementioned methods so as to map, render, convert and/or manipulate the color information according to the previous embodiments.

Some preferred embodiments of the present invention may be summarized as follows:

Color Mapping Functions and Representations

|  | Color code | Color function |
| --- | --- | --- |
| U: Color System | $u(\alpha_i, \beta_i, \sigma_i)$<br>$\alpha_i, \beta_i, \sigma_i \in \{0, 1, \ldots, 255\}$ | $l(\alpha_i, \beta_i, \sigma_i) = 2^{\alpha_i} 3^{\beta_i} 5^{\sigma_i}$ |
| CMYK System | $\#(c_i, m_i, y_i, k_i)$<br>$c_i, m_i, y_i, k_i \in \{0, 1, \ldots, 99\}$ | $f(c_i, m_i, y_i, k_i) = (2^{c_i-k_i} 3^{m_i-k_i} 5^{y_i-k_i} 30^{k_i})^{255/99}$<br>$c_i - k_i, m_i - k_i, y_i - k_i \geq 0$ |
| RGB System | $\Delta(r_i, g_i, b_i)$<br>$r_i, g_i, b_i \in \{0, 1, \ldots, 255\}$ | $q(r_i, g_i, b_i) = 2^{255-r_i} 3^{255-g_i} 5^{255-b_i}$ |

-continued

| Color code | Color function |
|---|---|
| HSV System | * $(h_i\ s_i\ v_i)$<br>$h_i \in \{1°, 2°, \ldots, 360°\}$<br>$s_i\ v_i \in \{1, 2, \ldots, 100\}$ | $t(h_i\ s_i\ v_i) =$<br><br>$2^{-ri+\frac{255}{100}si}\ 3^{-gi+\frac{255}{100}si}\ 5^{-bi+\frac{255}{100}si}\ 30^{255-\frac{255}{100}si}$<br><br>$1° \le h_i = 360° - \frac{30°}{128}(255 - r_i + g_i + b_i) \le 180°$<br><br>$181° \le h_i = \frac{30°}{128}(255 - r_i + g_i + b_i) \le 360°$<br><br>$v_i = [\text{Max}\ (ri, gi, bi)]\frac{100}{255}$ |

Color Manipulations Functions

| | |
|---|---|
| Color conversion | $2^{\alpha_i} 3^{\beta_i} 5^{\sigma_i} = f(c_i, m_i, y_i, k_i) = q(r_i, g_i, b_i) = t(h_i, s_i, v_i)$ |
| Color mixing | Mixture (color 1, color2, ..., color n) = $2^{\Sigma_{1n}\ \alpha_i}\ 3^{\Sigma_{1n}\ \beta_i}\ 5^{\Sigma_{1n}\ \sigma_i}$ |

It will be appreciated that where the methods and systems of the present invention are either wholly implemented by computing system or partly implemented by computing systems then any appropriate computing system architecture may be utilized. This will include stand alone computers, network computers and dedicated hardware devices. Where the terms "computing system" and "computing device" are used, these terms are intended to cover any appropriate arrangement of computer hardware capable of implementing the function described.

For example, in the abovementioned embodiments, features such as the color mapper, the manipulation module, the conversion module, the color fitting module, the color mixer and/or the processing module, may be implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention. The computer may comprise suitable components necessary to receive, store and execute appropriate computer instructions.

It will also be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A color processing system for identifying, mixing, blending and rendering colors and for converting between color representation systems comprising:
    a color mapper programmed to map a plurality of colors with a plurality of numerical codes, each of said plurality of numerical codes representing a unique color in a color space, wherein the each of the plurality of numerical codes is a unique integer determined based on a multiplication of prime numbers; wherein each of the prime numbers represents a respective basic color of the color space and wherein the unique integer is obtained by a multiplication of all color components $p_i^j$, wherein each $p_i$ is the prime number denoting each of the basic colors i, and j represents an intensity of each of the color components $p_i$;
    a processing module comprising one or more processors programmed to process information associated with said plurality of numerical codes; and
    a color renderer functionally connected to said processing module and arranged to render a color based upon a signal received from said processing module.

2. The color processing system according to claim 1, wherein the prime numbers include at least 2, 3 and 5.

3. The color processing system according to claim 1, wherein the unique color i is represented by the integer is denoted by I (i), and follows a relationship of I $(i) = p_1^{\alpha_i} p_2^{\beta_i} p_3^{\sigma_i}$.

4. The color processing system according to claim 3, wherein the intensities of each of the color components are represented by $\alpha_i, \beta_i, \sigma_i \in \{0,1,2, \ldots, 255\}$.

5. The color processing system according to claim 3, wherein the integer is obtained by the multiplication of all the color components $p_i^j$ and a darkness level component, wherein the darkness level component is associated with a combination of all of the color components $p_i^j$.

6. The color processing system according to claim 5, wherein the integer is denoted by I, and is represented as I $(i) = P_1^{\alpha_i - \delta_i} P_2^{\beta_i - \delta_i} P_3^{\sigma_i - \delta_i} p_1 p_2 p_3^{\delta_i}$, wherein $\delta_1$, represents an intensity of the darkness level component.

7. The color processing system according to claim 6, wherein $\delta_i = \min(\alpha_i, \beta_i, \sigma_i)$ $\alpha_i - \delta_i \ge 0$, $\beta_i - \delta_i \ge 0$, $\sigma_i - \delta_i \ge 0$, and $\alpha_i, \beta_i, \sigma_i, \delta_i \in \{0,1,2, \ldots, 255\}$.

8. The color processing system according to claim 1, wherein the basic colors includes cyan, magenta and yellow.

9. The color processing system according to claim 1, wherein said processing module further comprises one or more of a color manipulation module programmed to manipulate the numerical codes so as to determine one or more target colors associated with one or more baseline colors in the color space; a conversion module programmed to convert the numerical code representing a target color in the color space to an alternative color code in an alternative color representation system; and a color fitting module programmed to convert a first color in a first color representation system to a second color in a second color representation system, wherein renderings generated by the first color and by the second color are substantially equivalent to each other, or to obtain a desired color in a first color representation system by combining two or more available colors in a second color representation system.

10. The color processing system according to claim 9, wherein the color manipulation module is arranged to determine whether there is a complementary relationship among multiple colors m in the color space, where m colors are complementary colors if $\alpha_1 + \alpha_2 + \ldots + \alpha_m = \beta_1 + \beta_2 + \ldots + \beta_m = \sigma_1 + \sigma_2 + \ldots + \sigma_m$ for all the m colors $p_1^{\alpha_1} p_2^{\beta_1} p_3^{\sigma_1}, p_1^{\alpha_2} p_2^{\beta_2} p_3^{\sigma_2}, \ldots, p_1^{\alpha_m} p_2^{\beta_m} p_3^{\sigma_m}$.

11. The color processing system according to claim 9, wherein the color manipulation module is arranged to determine whether there is a monochromatic relationship between the target color and the baseline color.

12. The color processing system according to claim 11, wherein two colors $p_1^{\alpha_1} p_2^{\beta_1} p_3^{\sigma_1}$ and $p_1^{\alpha_2} p_2^{\beta_2} p_3^{\sigma_2}$ are monochromatic if the two colors have the same hue ratio.

13. The color processing system according to claim 11, wherein the two colors are monochromatic if:

$$\frac{\alpha 1}{\beta 1} = \frac{\alpha 2}{\beta 2} \text{ for } \sigma_1 = \sigma_2 = 0; \text{ or}$$

$$\frac{\alpha 1}{\sigma 1} = \frac{\alpha 2}{\sigma 2} \text{ for } \beta_1 = \beta_2 = 0; \text{ or}$$

$$\frac{\beta 1}{\sigma 1} = \frac{\beta 2}{\sigma 2} \text{ for } \alpha_1 = \alpha_2 = 0.$$

14. The color processing system according to claim 9, wherein the manipulation module is arranged to determine a mixture color based on two or more colors in the color space.

15. The color processing system according to claim 14, wherein the mixture color is a multiplication of the all the integers representing each of the two or more colors.

16. The color processing system according to claim 15, wherein the mixture color based on n colors is represented as $M(1, 2, 3, \ldots, n)$, wherein $M(1, 2, 3, \ldots, n) = p_1^{\Sigma_1^n \alpha_k} p_2^{\Sigma_1^n \beta_k} p_3^{\Sigma_1^n \sigma_k}$.

17. The color processing system according to claim 9, wherein the alternative color representation system is CMYK color representation.

18. The color processing system according to claim 17, wherein the conversion module is arranged to perform conversion according to a first conversion relationship of:

$$f(c_i, m_i, y_i, k_i) = \left[ p_1^{c_i - k_i}, p_2^{m_i - k_i}, p_3^{y_i - k_i}, p_1 p_2 p_3^{k_i} \right]^{\frac{255}{99}},$$

wherein the target color i in the CMYK color representation is represented as $\#c_i, m_i, y_i, k_i$, and wherein $c_i, m_i, y_i, k_i \in \{0,1,2,\ldots,99\}$ and wherein $k_i = \min\{c_i, m_i, y_i\}$.

19. The color processing system according to claim 9, wherein the alternative color representation system is RGB color representation.

20. The color processing system according to claim 19, wherein the conversion module is arranged to perform conversion according to a second conversion relationship of:

$$q(r_i, g_i, b_i) = q'(r_i, g_i, b_i, d_i) = p_1^{255 - r_i - d_i} p_2^{255 - g_i - d_i} p_3^{255 - b_i - d_i} p_1 p_2 p_3^{d_i},$$

wherein the target color i in the RGB color representation is represented as $\Delta r_i, g_i, b_i$, wherein $r_i, g_i, b_i \in \{0,1,2,3,\ldots,255\}$, and wherein $d_i = \min\{255 - r_i, 255 - g_i, 255 - b_i\}$ representing the level of white in the RGB color representation.

21. The color processing system according to claim 9, wherein the alternative color representation system comprises HSV color representation.

22. The color processing system according to claim 21, wherein the conversion module is arranged to perform conversion according to a third conversion relationship of:

$$t(h_i, s_i, v_i) = p_1^{-r_i + \left(\frac{255}{100}\right)s_i} p_2^{-g_i + \left(\frac{255}{100}\right)s_i} p_3^{-b_i + \left(\frac{255}{100}\right)s_i} p_1 p_2 p_3^{255 - \left(\frac{255}{100}\right)s_i},$$

wherein the target color i in the HSV color representation is represented as $* h_i s_i v_i$; wherein $h_i \in \{0°, 1°, 2°, 3°, \ldots, 360°\}$, $s_i \in \{0, 1\%, 2\%, \ldots, 100\%\}$ and $v_i \in \{0, 1\%, 2\%, \ldots, 100\%\}$; and wherein:

$$100 - s_i = \min(255 - r_i, 255 - g_i, 255 - s_i) \geq 0;$$

for $$g_i \geq b_i, 1° \leq h_i = 360° - 0° - \frac{30°}{128}(255 - r_i + g_i + b_i) \leq 180° \text{ or}$$

for $$g_i < b_i, 181° \leq h_i = \frac{30°}{128}(255 - r_i + g_i + b_i) \leq 360°; \text{ and}$$

$$v_i = [\max(ri, gi, bi)]^{\frac{100}{255}}.$$

23. The color processing system according to claim 9, wherein the color fitting module is arranged to determine a mixing weight of each of the two or more available colors in the second color representation system expected to produce said desired color when rendered.

24. The color processing system according to claim 9, wherein the color fitting module is further arranged to determine the mixing weights based on linear programming so as to minimize a difference between the first color and the second.

25. The color processing system according to claim 24, wherein the color fitting module is further arranged to determine the mixing weights based on a minimum difference between each of the basic colors of the first color and equivalent color components in the first color representation system of the second-color obtained by a combination of the two or more available colors.

26. The color processing system according to claim 1, wherein the color renderer includes a color paint mixer.

27. The color processing system according to claim 1, wherein the color renderer includes an electrical display unit.

28. The color processing system according to claim 1, wherein the color renderer includes a printer or a component in a printer.

29. The color coding system according to claim 9, wherein said first color representation system is RGB color representation and said second color representation system is CYMK color representation.

30. A method of rendering a target color from a first color code for said target color generated in a first color representation system selected from RGB, CMYK, and HSV color representation systems based upon a second color code for said target color generated in a second representation systems selected from a different one of said RGB, CMYK, and HSV color representation systems, said method comprising the steps of:
- A) converting the second color code representing a target color in a second color representation system selected from the group consisting of RGB, CMYK, and HSV color representation systems into a plurality of numerical codes in a universal color representation system, wherein each of said plurality of numerical codes represents a unique color in a color space, wherein the each of the plurality of numerical codes is a unique integer determined based on a multiplication of prime numbers; wherein each of the prime numbers represents a respective basic color of said second color representation system and wherein the unique integer is obtained by a multiplication of all color components $p_i^j$, wherein each $p_i$ is the prime number denoting each of the basic colors i, and j represents an intensity of each of the color components $p_i$;
- B) converting said plurality of numerical codes in the universal color representation system into color codes in said first color coding system; and
- C) rendering said target color using said first color codes.

31. The method of rendering a target color according to claim 30, wherein the second color i is represented by the integer denoted by I (i), and follows a relationship of I (i)=$p_1^{\alpha_i-\delta_i} p_2^{\beta_i-\delta_i} p_3^{\sigma_i-\delta_i} p_1 p_2 p_3^{\delta_i}$, wherein $\delta_i$=min($\alpha_i$, $\beta_i$, $\sigma_i$), $\alpha_i-\delta_i \geq 0$, $\beta_i-\delta_i \geq 0$, $\sigma_i-\delta_i \geq 0$, and $\alpha_i$, $\beta_i$, $\sigma_i$, $\delta_i \in \{0, 1, 2, \ldots, 255\}$.

32. The method of rendering a target color according to claim 31, wherein the first color representation system is CMYK color representation.

33. The method of rendering a target color according to claim 32, comprising the steps of performing conversion according to a first conversion relationship of:

$$f(c_i, m_i, y_i, k_i) = \left[p_1^{c_i-k_i}, p_2^{m_i-k_i}, p_3^{y_i-k_i}, p_1 p_2 p_3^{k_i}\right]^{\frac{255}{99}},$$

wherein the target color i in the CMYK color representation is represented as #$c_i$, $m_i$, $y_i$, $k_i$, and wherein $c_i$, $m_i$, $y_i$, $k_i \in \{0,1,2, \ldots, 99\}$ and wherein $k_i$=Min$\{c_i, m_i, y_i\}$.

34. The method of rendering a target color according to claim 31, wherein the first color representation system is RGB color representation.

35. The method of rendering a target color according to claim 34, comprising the steps of performing conversion according to a second conversion relationship of:

$$q(r_i,g_i,b_i)=q'(r_i,g_i,b_i,d_i)=p_1^{255-r_i-d_i} p_2^{255-g_i-d_i} p_3^{255-b_i-d_i} p_1 p_2 p_3^{d_i},$$

wherein the target color i in the RGB color representation is represented as Δ $r_i$, $g_i$, $b_i$, wherein $r_i$, $g_i$, $b_i \in \{0,1,2, 3, \ldots, 255\}$, and wherein di=Min$\{255-r_i, 255-gi, 255-b_i\}$ representing the level of white in the RGB color representation.

36. The method of rendering a target color according to claim 31, wherein the first color representation system is HSV color representation.

37. The method of rendering a target color according to claim 36, comprising the steps of performing conversion according to a third conversion relationship of:

$$t(h_i, s_i, v_i) = p_1^{-r_i+\left(\frac{255}{100}\right)s_i} p_2^{-g_i+\left(\frac{255}{100}\right)s_i} p_3^{-b_i+\left(\frac{255}{100}\right)s_i} p_1 p_2 p_3^{255-\left(\frac{255}{100}\right)s_i},$$

wherein the target color i in the HSV color representation is represented as * $h_i$ $s_i$ $v_b$; wherein $h_i \in \{0°,1°,2°, 3°, \ldots, 360°\}$, $s_i \in \{0, 1\%, 2\%, \ldots, 100\%\}$ and $v_i \in \{0, 1\%, 2\%, \ldots, 100\%\}$; and wherein:

$$100 - s_i = \text{Min}(255 - r_i, 255 - g_i, 255 - s_i) \geq 0;$$

for $$g_i \geq b_i, 1° \leq h_i = 360° - 0° - \frac{30°}{128}(255 - r_i + g_i + b_i) \leq 180° \text{ or}$$

for $$g_i < b_i, 181° \leq h_i = \frac{30°}{128}(255 - r_i + g_i + b_i) \leq 360°; \text{ and}$$

$$v_i = [\text{Max}(ri, gi, bi)]^{\frac{100}{255}}.$$

38. The method of rendering a target color according to claim 30, wherein the prime numbers include at least 2, 3 and 5.

39. The method of rendering a target color according to claim 30, wherein each of the prime numbers represents a respective basic color of the color space, and wherein the basic colors include cyan, magenta and yellow.

40. A method rendering a target color based on two or more colors in a color space; wherein each of the target color and the two or more colors are represented as numerical code of an integer determined based on a multiplication of prime numbers, each integer being obtained by a multiplication of all color components $p_i^j$ of that color, wherein each $p_i$ is the prime number denoting each of the basic colors i, and j represents an intensity of each of the color components $p_i$ comprising the steps of:
- A. determining the target color by multiplying all the integers representing each of said two or more colors to obtain a color code for said target color;
- B. sending said color code for said target color to a color renderer;
- C. rendering said target color using said color renderer.

41. The method of rendering a target color according to claim 40, wherein the target color i is represented by the integer denoted by I (i), and follows a relationship of I (i)=/$P_1^{\alpha_i} p_2^{\beta_i} p_3^{\sigma_i}$, wherein the intensities of each of the color components are represented by $\alpha_i$, $\beta_i$, $\sigma_i \in \{0, 1, 2, \ldots, 255\}$.

42. The method of rendering a target color according to claim 40, wherein the target color is based on n colors and is represented as M(1, 2, 3, \ldots, n), wherein M(1, 2, 3, \ldots, n)=$p_1^{\Sigma_1^n \alpha_k} p_2^{\Sigma_1^n \beta_k} p_3^{\Sigma_1^n \sigma_k}$.

43. The method of rendering a target color according to claim 40, wherein the prime numbers include at least 2, 3 and 5.

44. The method of rendering a target color according to claim 40, wherein each of the prime numbers represents a respective basic color of the color space, and wherein the basic colors include cyan, magenta and yellow.

45. The method of rendering a target color according to claim 40, further comprising the step of converting the target color equals to a first color in a first color representation system to a second color in a second color representation system; wherein renderings generated by the first color and by the second color are substantially equivalent to each other.

46. The method of rendering a target color according to claim 45, further comprising the step of obtaining the first color in the first color representation system by combining two or more available colors in the second color representation system.

47. The method of rendering a target color according to claim 46, further comprising the step of determining a mixing weight of each of the two or more available colors in the second color representation system.

48. The method of rendering a target color according to claim 47, further comprising the step of determining the mixing weights based on linear programming so as to minimize a difference between the first color and the second color.

49. The method of rendering a target color according to claim 48, further comprising the step of determining the mixing weights based on a minimum difference between each of the basic colors of the first color and equivalent color components in the first color representation of the second color obtained by a combination of the two or more available colors.

* * * * *